United States Patent [19]

Offterdinger

[11] 4,407,050
[45] Oct. 4, 1983

[54] CLAMPS

[76] Inventor: Hermann F. Offterdinger, 1109-5170 Lakeshore Rd. East, Burlington, Ontario, Canada, L7L 1C4

[21] Appl. No.: 347,811

[22] Filed: Feb. 11, 1982

Related U.S. Application Data

[63] Continuation-in-part of Ser. No. 215,608, Dec. 12, 1980, abandoned, which is a continuation-in-part of Ser. No. 47,659, Jun. 11, 1979, abandoned.

[51] Int. Cl.³ .................. F16L 33/10; B65D 63/00
[52] U.S. Cl. ...................................... 24/277; 24/279; 24/243 E; 285/382.2
[58] Field of Search ............... 24/277, 278, 279, 280, 24/276, 243 E; 285/420, 199, 382.2; 72/368, 369

[56] References Cited

U.S. PATENT DOCUMENTS

| 184,599 | 11/1876 | Ehrhardt | 285/420 |
|---|---|---|---|
| 2,936,186 | 5/1960 | Dunmire | 24/279 |
| 2,959,834 | 11/1960 | Graham | 24/277 |
| 3,040,407 | 6/1962 | Brown | 24/277 |
| 3,173,196 | 3/1965 | Grimm | 72/368 |
| 3,209,426 | 10/1965 | Vlasak | 24/277 |

Primary Examiner—Robert Peshock
Assistant Examiner—Kris R. Schulze
Attorney, Agent, or Firm—Hirons, Rogers & Scott

[57] ABSTRACT

A clamp consists of a clamp bolt cooperating with an arcuate saddle which together encircle an article to be clamped, the clamp bolt constituting tightening means for tightening the clamp on the article. The saddle terminates in two tubular portions which receive the bolt and provide respective bearing surfaces for the head and the clamping nut, or the two clamping nuts, depending on the nature of the bolt. The saddle is formed by stamping from a rectangular blank of thin flat sheet metal, the blank being formed into a hollow tube with the longer edges in contact with one another and bent to the necessary arcuate shape, the joint between the longer edges being disposed in the radially inner concave face so that it contacts the article to be clamped. The radially-outer central tube wall portion preferably is collapsed into contact with the radially-inner central tube wall portion so as to form a double-walled channel-section saddle with the said tubular portions integral therewith formed by the uncollapsed tube ends. Preferably the channel is of semi-circular transverse cross section.

20 Claims, 16 Drawing Figures

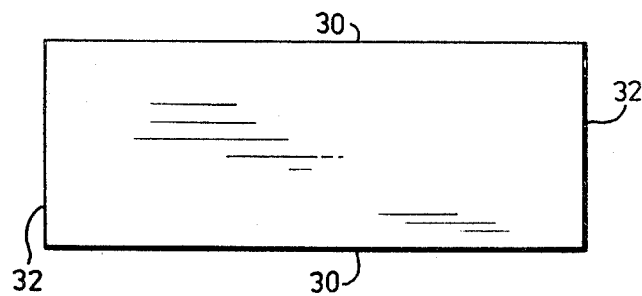
FIG. 2a
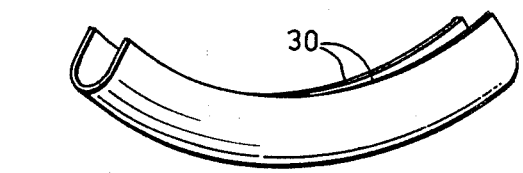
FIG. 2c
FIG. 2b
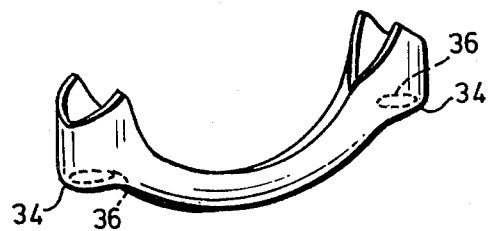
FIG. 2d
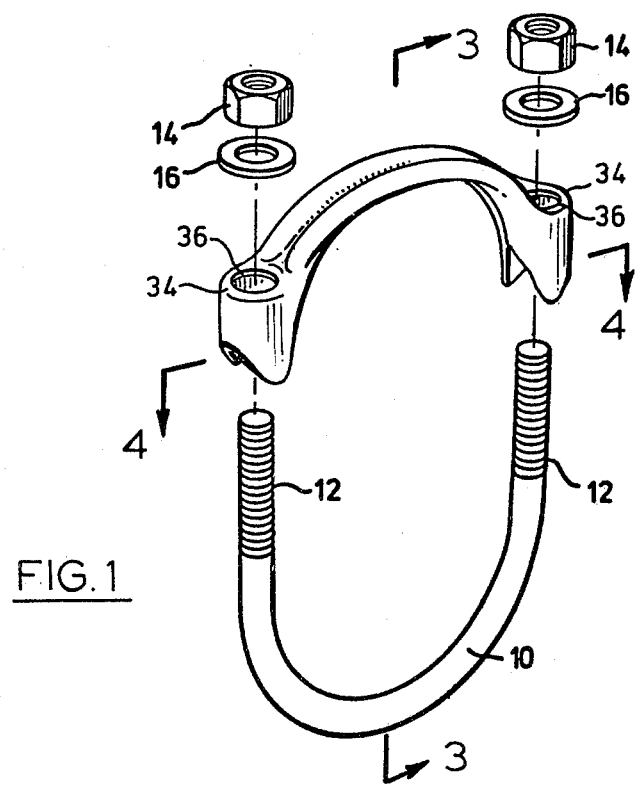
FIG. 1

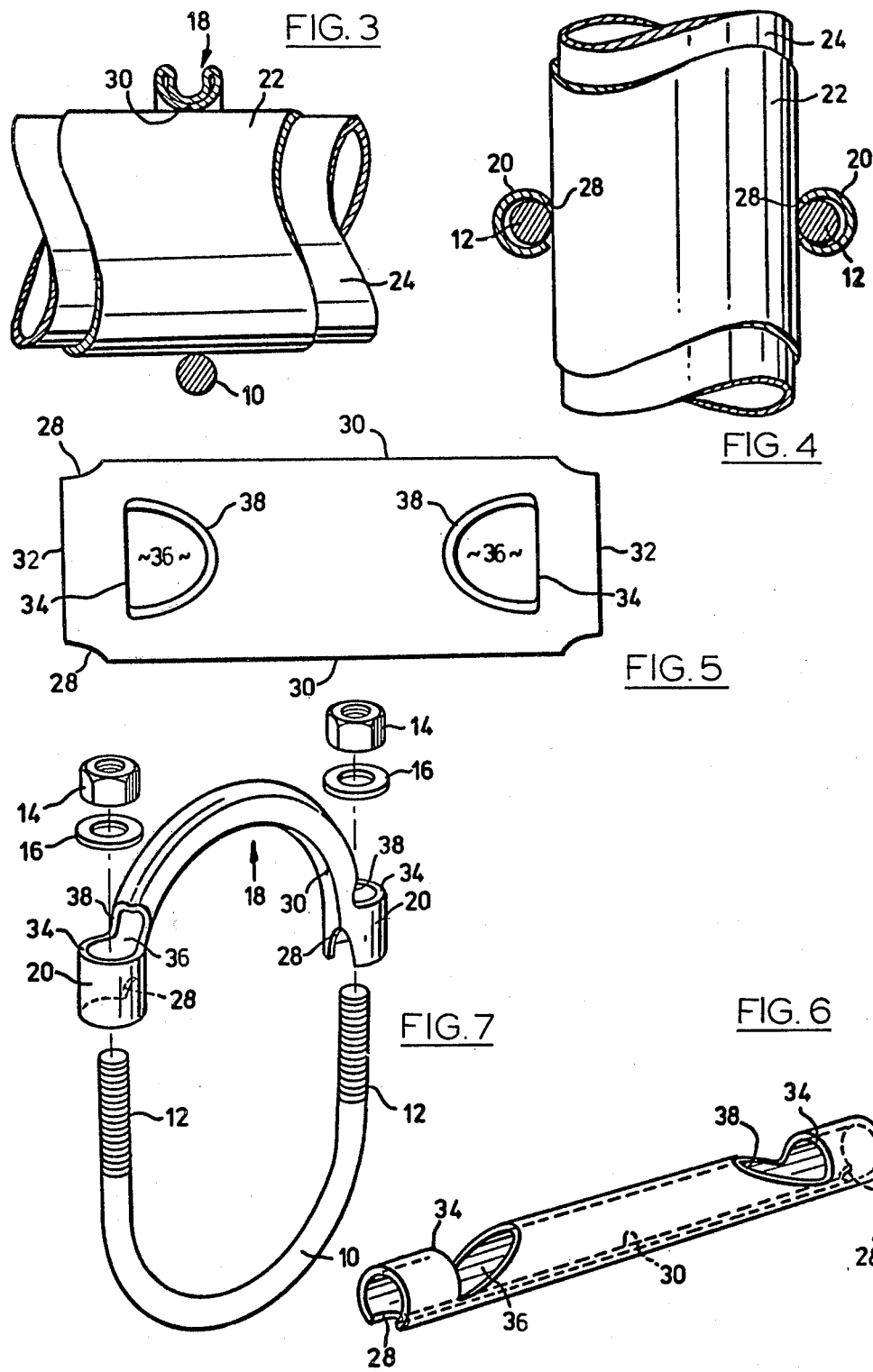

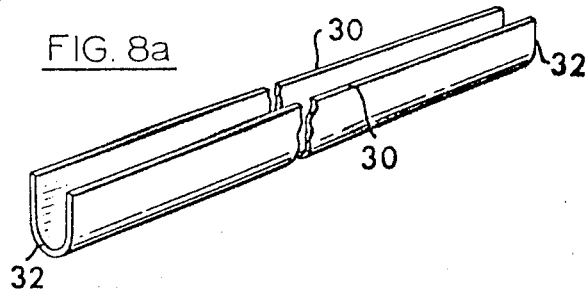
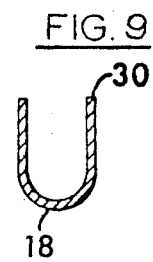
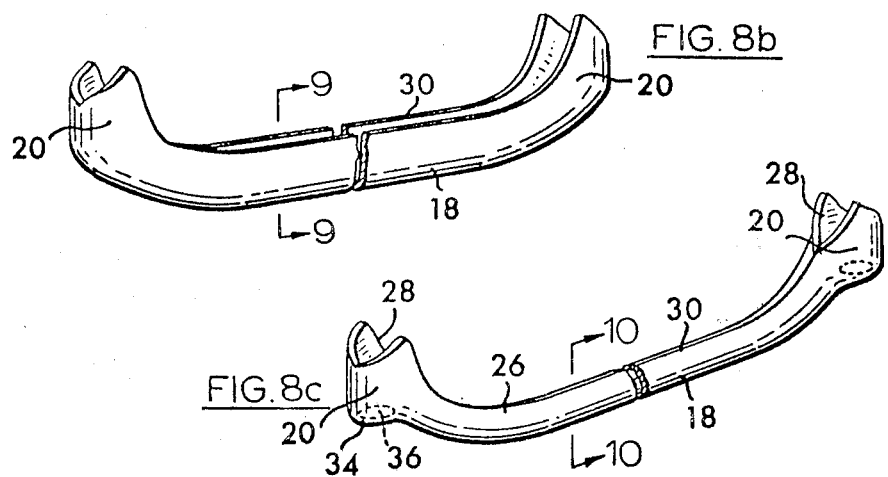
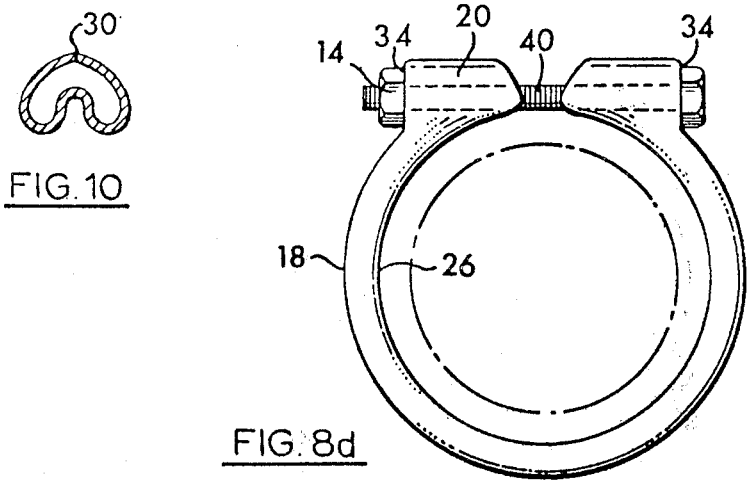

CLAMPS

CROSS-REFERENCE TO RELATED APPLICATIONS

This application is a continuation-in-part of my prior application Ser. No. 215,608, filed Dec. 12, 1980, which is a continuation-in-part of my prior application Ser. No. 047,659, filed June 11, 1979, both of which are now abandoned.

FIELD OF THE INVENTION

The present invention is concerned with improvements in or relating to clamp saddle members for clamps of the type consisting of a clamp bolt member and a cooperating so-called saddle, the bolt member and the saddle together encircling an article to be clamped thereby. Such clamps are employed, for example, to clamp together two telescoped tubular members.

Review of the Prior Art

The quantity of the said type of clamp now manufactured each year in North America alone is in the tens of millions, one of the principal applications being in the installation of automobile exhaust systems to clamp together two telescoped steel pipes of circular cross-section. This particular field is exceptionally cost competitive and, as long as the clamp will perform satisfactorily, differences in price of only a fraction of a cent can mean the gain or loss of a contract involving several million clamps. It is essential therefore that the clamps be made by automatic processes, usually involving heavy metal presses, and the savings to be made in the processes are limited. A much more fruitful approach at this time is to attempt to reduce the amount of metal required for the production of an effective clamp.

Definition of the Invention

It is an object of the invention to provide a clamp saddle member of new construction for a clamp of the type specified.

It is another object to provide a new clamp saddle member for a clamp of the type specified which employs a smaller amount of metal than prior art clamps known to me of equivalent performance.

In accordance with the present invention there is provided a clamp comprising:

a clamp bolt member, and a clamp saddle member formed from a piece of sheet metal, the bolt member and the saddle member cooperating with one another to encircle the clamp-receiving member, the bolt member including means for tightening the clamp about the clamp-receiving member, the clamp saddle member having a bight portion of arcuate shape so as to have a concave side for engagement with the clamp-receiving member and an opposite convex side, the saddle member having two integral spaced bolt-receiving portions at the respective ends of the arcuate bight portion which receive the bolt member and the tightening means for the application of clamping force to the clamp by the said tightening means, wherein the said arcuate saddle bight portion consists of a portion of the sheet metal piece that has been bent to closed tubular form with opposite edges thereof butting against one another at a longitudinal junction disposed in the radially inner wall of the saddle bight portion, so that the junction contacts the clamp-receiving member as the clamp is tightened about the member.

Also in accordance with the invention there is provided a clamp saddle member for a clamp of the type which encircles a clamp-receiving member on which it is clamped, the clamp comprising:

a clamp bolt member, and a clamp saddle member formed from a piece of sheet metal, the bolt member and the saddle member cooperating with one another to encircle the clamp-receiving member, the bolt member including means for tightening the clamp about the clamp-receiving member, the clamp saddle member having a bight portion of arcuate shape so as to have a concave side for engagement with the clamp-receiving member and an opposite convex side, the saddle member having two integral spaced bolt-receiving portions at the respective ends of the arcuate bight portion which receive the bolt member and the tightening means for the application of clamping force to the clamp by the said tightening means, wherein the said arcuate saddle bight portion consists of a portion of the sheet metal piece that has been bent to closed tubular form with the radially outer wall portion thereof collapsed toward the radially inner wall portion, so that the bight thereby consists of two immediately adjacent thicknesses of the metal sheet and is of open-sided channel transverse cross-section with the channel opening at the radially outer convex side.

DESCRIPTION OF THE DRAWINGS

Clamps which are particular preferred embodiments of the invention will now be described, by way of example, with reference to the accompanying diagrammatic drawings, wherein:

FIG. 1 is an exploded perspective view of a complete saddle clamp constituting a first embodiment of the invention, FIGS. 2a through 2d are perspective views showing the progressive formation of the saddle clamp by a series of stamping operations, FIGS. 3 and 4 are plane sections through the clamp respectively on the lines 3—3 and 4—4 of FIG. 1, and showing the clamp placed on two telescoped tubular members to clamp them together, FIG. 5 is a plan view similar to FIG. 2a of a blank from which is to be formed a clamp saddle of a clamp constituting a second embodiment of the invention, FIG. 6 is a perspective view showing the blank of FIG. 5 folded about a longitudinal axis to an intermediate tube shape, FIG. 7 is an exploded view of the said second embodiment clamp.

FIGS. 8a through 8c are perspective views similar to FIGS. 2b through 2d to show the progressive formation of another clamp of the invention from a blank, FIG. 8d is an end elevation of the clamp resulting from the steps illustrated by FIGS. 8a through 8c, and FIGS. 9 and 10 are respective cross-sections taken on the lines 9—9 and 10—10 of FIGS. 8b and 8c respectively.

Similar parts are given the same reference number in all the Figures of the drawing.

DESCRIPTION OF THE PREFERRED EMBODIMENTS

The clamps of FIGS. 1–7 each consists of a U-bolt 10 having a semi-circular central bight portion and two parallel leg portions 12, one at each end of the bight portion, the leg portions being screw-threaded at their ends and receiving respective clamping nuts 14. Washers 16 may or may not be provided for cooperation with each nut, or the nuts may be of the kind provided with integral washer portions. The clamp also consists of a saddle 18 of arcuate shape and terminating at its ends in two tubular portions 20 through which the leg portions 12 extend for the clamp to surround and clamp onto an object or objects placed between them, such as the pair of telescoped tubes 22 and 24 shown in FIGS. 3 and 4. The concave face 26 of the saddle is also semi-circular and of extent such that it will cooperate with the semi-circular bolt bight to embrace completely the circumference of the outermost tube 22. The tubular portions 20 are cut away in a V- or U-shape at 28 on the concave face 26 to expose as much as possible of the circumference of tube 22 to the U-bolt bight, and eliminate as much as possible any gap in the transition of clamping contact from the bolt bight to the saddle bight.

The saddle preferably is formed by stamping a suitably-shaped blank from a metal sheet and is made with the central bight portion of the saddle between the tubular bolt leg receiving portions 20 of open channel cross-section with the channel opening at the convex face, the central portion merging smoothly into the tubular portions 20. In the two embodiments specifically illustrated herein the channel is of semi-circular transverse cross-section, as seen most clearly in FIG. 4, but other cross-sections can also be used, such as open-sided rectangular or V- or U-shaped. This open-channel cross-section with the channel opening radially outwards permits high clamping pressures to be produced at the line of contact between the clamp and the object being clamped with the use of a minimum of metal for the saddle.

It will also be seen that the junction between opposite butting edges 30 of the metal blank is located in the radially inner wall of the saddle, so that it directly contacts the outer surface of the outer tube. This location of the junction is therefore such that it is held closed by the adjacent part of the tube wall and the pressure applied to the clamp is clamped tightly cannot force the edges apart to any significant extent. In some particular applications it may be desirable to fasten the edges together, e.g. by welding or an adhesive, but for the most common application of such clamps, namely the clamping of automobile muffler pipes, no such fastening is found to be necessary.

Referring now to FIGS. 2a through 2d, a preferred form of metal blank to produce the saddle of the first embodiment is shown in FIG. 2a, and is of rectangular shape having longer parallel edges 30 and shorter edges 32. The blank is formed by a series of metal-working steps, for example on an indexing table with a corresponding plurality of dies, or using a single progressive die with the corresponding plurality of stations, into the arcuate saddle of FIG. 1. In one step the blank is formed to the shape illustrated by FIG. 2b, in which the two longer edges 30 are folded toward each other until the blank assumes a U-shape transverse cross-section, while at the same time the blank is bent along its longer dimension to the arcuate form illustrated. In a second step which is not illustrated the end portions are shaped closer to that required to form the bolt-receiving tubular portions 20, this step causing the side walls between the tubular portions to bulge outwards. The piece is therefore immediately subjected to a further step to result in the shape of FIG. 2c, with which those side walls are again parallel.

In the next step to produce the shape of FIG. 2d the edges are rolled inwards until they abut one another to form a hollow tube, and the portion of this tube between the two portions 28 is collapsed, so that the radially-outer part of the tube wall is in contact with the radially-inner part of the wall to form a double walled saddle having the junction of the two edges 30 in the radially-inner portion centrally located therein. At the same time the end parts are provided with co-planar flat surfaces 34 for the tubular portions 20 that subsequently, after the punching of bolt-leg receiving holes 36 therein, provide the nut-bearing surfaces receiving washers 16 and nuts 14.

The cross-section of the central part of the saddle is best seen in FIG. 3, while that of the tubular portions 20 is seen in FIG. 4. It will be appreciated by those skilled in the art that the use of the closed tubular form gives a saddle of high strength/weight ratio. As described above the location of the junction between the abutting edges against the article to be clamped ensures that it will withstand the required high clamping forces. The radially outer portion of the tubular body would be less effective than the radially-inner portion in providing for rigidity of the clamp saddle, and the collapsing of the radially outer portion against the radially-inner portion gives extra rigidity where required, and is therefore to be preferred. The use of this tubular form also provides an elegant way of pre-forming the tubular portions 20 for receiving the bolt legs.

In a second embodiment illustrated by FIGS. 5–7 the metal blank is also of rectangular shape, but during its formation the corners are removed to provide the V- or U-shape cut-aways 28 upon rolling the blank about a longitudinal axis into the tubular form shown in FIG. 6. The blank is provided with two U-shaped apertures 36 having their straight base edges 34 parallel and closely adjacent to the respective blank shorter sides 32, while the respective concave edges 38 extend toward each other. In the tubular form of FIG. 6 these apertures form respective organ-pipe like openings. The tube is then shaped to the arcuate final form of FIG. 7, where the blank longer edges 30 will be butted against each other, if they were not when the tube was rolled. As the tube is shaped the portion of the hollow tube between the two apertures is collapsed, as with the embodiment of FIGS. 1–4 to form a double-walled saddle having the junction of edges 30 in the radially-inner portion. The uncollapsed ends of the tube form the leg receiving portions 20, while the aperture edges 34 form the bearing surfaces for the washers 16 and the clamping nuts 14.

The invention is also applicable to the type of clamp in which only a single clamping nut is used on one of the legs of the U-bolt, the other U-bolt leg being attached in some other manner to the other end of the saddle portion, for example by being hooked thereto.

The clamp illustrated by FIGS. 8a–8d, 9 and 10 is of the kind in which the saddle extends over nearly 360 degrees to form nearly a complete circle, so that only a short straight bolt 40 and a single nut 14 are required in place of the U-bolt 10 and two nuts 14 of the previously described embodiments. The particular utility of the saddle clamp of FIGS. 1 to 7 is of course that they can be engaged around a tubular article without the need to slide the parts from one free end, which may not always be possible, especially with automobile muffler systems. The clamp of this embodiment must be slid over one end of such an article. Clamps are also known in which the saddle portion extends over only 90 degrees, or over 270 degrees while the bolt member extends over 270 degrees or 90 degrees respectively to complete its encirclement of the object.

The same reference numbers are used in FIGS. 8a–8d, 9 and 10 as in FIGS. 1–7 for similar parts. The clamp saddle is made from a rectangular blank as illustrated by FIG. 2a, but somewhat more elongated. This is first formed to the open channel shape of FIG. 8b with the ends turned up to permit the subsequent formation of the bolt-receiving portions 20. The progressive formation is then continued as illustrated by FIG. 8c, in which the bolt apertures 36 have been stamped out, the edges 30 have been butted together to form the required radially-inner junction, and the radially outer portion of the tube wall has been collapsed toward the radially-inner portion to give the preferred double-wall channel corss-section structure. The clamp is completed by a short straight bolt 40 which has its head engaged against one surface 34 and its clamping nut 14 against the other.

It will be seen therefore that I have provided simple and effective clamps that can readily be formed by stamping and bending operations from thin sheet metal, without requiring deep drawing or acuate bending, at least in the preferred embodiments illustrated. It is found for example that a prior art saddle clamp, as shown for example in my U.S. Pat. No. 3,919,747, when intended for use to clamp on a tubular pipe of 5 cm diameter, requires the use of sheet steel of about 0.3 cm thickness, while a corresponding clamp of this invention employs metal of about 0.15 cm thickness. Moreover, the blank used for the production of the clamps of this invention in such a size is very much smaller and requires only about one third of the metal of my prior clamp. In addition, since the nut-receiving surfaces 34 are much closer to the diameter of the tubular members 22 and 24 the legs of the U-bolts can be shorter. The resultant saving in metal produces a very significant saving in overall cost of the resultant clamps.

I claim:

1. A clamp saddle member for a clamp of the type which encircles a clamp-receiving member on which it is clamped, the clamp comprising:
    a clamp bolt member, and
    a clamp saddle member formed from a piece of sheet metal,
    the bolt member and the saddle member cooperating with one another to encircle the clamp-receiving member,
    the bolt member including means for tightening the clamp about the clamp-receiving member,
    the clamp saddle member having a bight portion of arcuate shape so as to have a concave side for engagement with the clamp-receiving member and an opposite convex side,
    the saddle member having two integral spaced bolt-receiving portions at the respective ends of the arcuate bight portion which receive the bolt member and the tightening means for the application of clamping force to the clamp by the said tightening means,
    wherein the said arcuate saddle bight portion consists of a portion of the sheet metal piece that has been bent to closed tubular form with opposite edges thereof butting against one another at a longitudinal junction disposed in the radially inner wall of the saddle bight portion, so that the junction contacts the clamp receiving member as the clamp is tightened about the member.

2. A clamp saddle member as claimed in claim 1, wherein the arcuate saddle bight portion has the radially outer wall portion thereof collapsed toward the radially inner wall portion, so that the bight is of open-sided channel transverse cross-section with the channel opening at the radially outer convex side.

3. A clamp saddle member as claimed in claim 1, wherein the said bight portion of the clamp saddle member is semi-circular and is used in combination with a U-bolt having a semi-circular bight portion, so that the clamp will embrace and contact the circumference of an object of circular transverse cross-section placed between them.

4. A clamp saddle member as claimed in claim 2, wherein the said bight portion of the clamp saddle member is semi-circular and is used in combination with a U-bolt having a semi-circular bight portion, so that the clamp will embrace and contact the circumference of an object of circular transverse cross-section placed between them.

5. A clamp as claimed in any one of claims 1 to 3, wherein the bight portion of the saddle is of semi-circular transverse cross-section.

6. A clamp as claimed in any one of claims 1 to 3, wherein the said bolt-receiving portions are of tubular form and are cut away on the said concave side to expose corresponding portions of the bolt member to the object being clamped.

7. A clamp saddle member as claimed in claim 1 or 2, wherein the said arcuate shaped bight portion of the clamp saddle member extends over substantially a complete circle and is used in combination with a straight bolt passing through the bolt receiving portions to encircle the clamp-receiving member.

8. A clamp saddle member for a clamp of the type which encircles a clamp-receiving member on which it is clamped, the clamp comprising:
    a clamp bolt member, and
    a clamp saddle member formed from a piece of sheet metal,
    the bolt member and the saddle member cooperating with one another to encircle the clamp-receiving member,
    the bolt member including means for tightening the clamp about the clamp-receiving member,
    the clamp saddle member having a bight portion of arcuate shape so as to have a concave side for engagement with the clamp-receiving member and an opposite convex side,
    the saddle member having two integral spaced bolt-receiving portions at the respective ends of the arcuate bight portion which receive the bolt member and the tightening means for the application of clamping force to the clamp by the said tightening means,
    wherein the said arcuate saddle bight portion consists of a portion of the sheet metal piece that has been bent to closed tubular form with the radially outer wall portion thereof collapsed toward the radially inner wall portion, so that the bight thereby consists of two immediately adjacent thicknesses of the metal sheet and is of open-sided channel transverse cross-section with the channel opening at the radially outer convex side.

9. A clamp saddle member as claimed in claim 8, wherein the said bight portion of the clamp saddle member is semi-circular and is used in combination with a U-bolt having a semi-circular bight portion, so that the clamp will embrace and contact the circumference of an object of circular transverse cross-section placed between them.

10. A clamp as claimed in claim 8 or 9, wherein the bight portion of the saddle is of semi-circular transverse cross-section.

11. A clamp as claimed in claim 8 or 9, wherein the said bolt-receiving portions are of tubular form and are cut away on the said concave side to expose corresponding portions of the bolt member to the object being clamped.

12. A clamp saddle member as claimed in claim 8, wherein the said arcuate shaped bight portion of the clamp saddle member extends over substantially a complete circle and is used in combination with a straight bolt passing through the bolt receiving portions to encircle the clamp-receiving member.

13. A clamp comprising:
   a U-bolt having a bight portion for engagement with an object to be clamped by the clamp and two leg portions each at one end of the bight portion, the leg portions being screw-threaded at their ends for the reception of respective clamping nuts,
   a saddle formed from a metal sheet with a bight portion of arcuate shape so as to have a concave side for engagement with an object to be clamped by the clamp and an opposite convex side, the saddle bight comprising two thicknesses of the metal sheet and being of open-sided channel transverse cross-section with the channel opening at the said convex side,
   the saddle having at its ends respective integral tubular portions through which the legs of the U-bolt extend for the clamp to surround an object between the bolt bight and the saddle bight concave side, and
   the tubular portions providing nut-bearing surfaces for receiving the said clamping nuts of the U-bolt.

14. A clamp as claimed in claim 13, wherein the saddle bight portion has a longitudinal edge junction between the two metal sheet thicknesses in the radially inner wall.

15. A clamp as claimed in claim 13 or 14, wherein the said bight portion of the U-bolt is semi-circular, and the bight portion of the arcuate saddle is also semi-circular, so that the clamp will embrace and contact the circumference of an object of circular transverse cross-section placed between them.

16. A clamp as claimed in claim 13 or 14, wherein the bight portion of the saddle is of semi-circular transverse cross-section.

17. A clamp comprising:
   a U-bolt having a bight portion for engagement on an object to be clamped by the clamp and two leg portions each at one end of the bight portion, at least one of the leg portions being screw-threaded at its end for the reception of a respective clamping nut,
   a saddle formed from a metal sheet with a bight portion of arcuate shape so as to have a concave side for engagement with an object to be clamped by the clamp and an opposite convex side, the saddle bight comprising two thicknesses of the metal sheet and being of open-sided channel transverse cross-section with the channel opening at the said convex side,
   the saddle having at its ends respective integral tubular portions through which the legs of the U-bolt extend for the clamp to surround an object between the bolt bight and the saddle bight concave side, and
   at least one of the tubular portions providing a nut-bearing surface for receiving the said clamping nut of the U-bolt.

18. A clamp as claimed in claim 17, wherein the saddle bight portion has a longitudinal edge junction between the two metal sheet thicknesses in the radially inner wall.

19. A clamp as claimed in claim 17 or 18, wherein the said bight portion of the U-bolt is semi-circular, and the bight portion of the arcuate saddle is also semi-circular, so that the clamp will embrace and contact the circumference of an object of circular transverse cross-section placed between them.

20. A clamp as claimed in claim 17 or 18, wherein the bight portion of the saddle is of semi-circular transverse cross-section.

* * * * *